United States Patent [19]

Aupor et al.

[11] Patent Number: 4,760,821
[45] Date of Patent: Aug. 2, 1988

[54] INTAKE SPIRAL DEVICE AND/OR TURBULENCE DEVICE FOR COMBUSTION ENGINES

[75] Inventors: Hans Aupor, Munich; Wilhelm Müller, Neufahrn, both of Fed. Rep. of Germany

[73] Assignee: Motoren-Werke Mannheim AG vorm. Benz Abt. stat. Motorenbau., Mannheim, Fed. Rep. of Germany

[21] Appl. No.: 3,382

[22] Filed: Nov. 5, 1986

[30] Foreign Application Priority Data

Mar. 5, 1985 [DE] Fed. Rep. of Germany ....... 3507767
Mar. 4, 1986 [WO] PCT Int'l Appl. ... PCT/DE86/00081

[51] Int. Cl.$^4$ ............................................. F02B 31/00
[52] U.S. Cl. ................. 123/308; 123/188 M; 123/52 M
[58] Field of Search ............................ 123/308, 188 M

[56] References Cited

U.S. PATENT DOCUMENTS

| | | | |
|---|---|---|---|
| 3,903,849 | 9/1975 | List et al. | 123/188 M |
| 4,699,104 | 10/1987 | Okumura | 123/308 |
| 4,703,729 | 11/1987 | Sakano et al. | 123/308 |

FOREIGN PATENT DOCUMENTS

| | | | |
|---|---|---|---|
| 58-197420 | 5/1982 | Japan | 123/308 |
| 148229 | 9/1983 | Japan | 123/308 |
| 43922 | 3/1984 | Japan | 123/308 |
| 60-45829 | 3/1985 | Japan | 123/308 |
| 60-92733 | 6/1985 | Japan | 123/308 |
| 150425 | 8/1985 | Japan | 123/308 |

*Primary Examiner*—E. Rollins Cross
*Attorney, Agent, or Firm*—Becker & Becker, Inc.

[57] ABSTRACT

At least one inlet channel (4) for each cylinder is developed as a filler channel in which there is a flap valve (13) turning on an axis (12). During full load operation, the flap valve (13) is in a rest position, which does not influence the flow through the inlet channel (4). During partial load operation, however, the flap valve (13) is in a working position, in which it shapes the flow in the inlet channel so unsymmetrically that at the mouth (6) of the inlet channel (4) leading into the cylinder (1) the compressed air flowing out in large quantities has a tendency toward spiral and/or turbulence-reinforcing directions. In this way, fuel preparation is improved during the partial load operation of the motor, leading to combustion with low smoke and noxious substance levels and low consumption.

10 Claims, 2 Drawing Sheets

INTAKE SPIRAL DEVICE AND/OR TURBULENCE DEVICE FOR COMBUSTION ENGINES

This application is a U.S. application of PCT application PCT/DE86/00081 filed Mar. 4, 1986, which in turn is based on German Patent application No. P 35 07 767.0 filed Mar. 5, 1985.

BACKGROUND OF THE INVENTION

The invention concerns an intake spiral device and/or turbulence device with at least one inlet channel per cylinder; the mouth of the inlet channel, which is in the combustion chamber, is closable by the valve disk of one inlet valve arranged in the cylinder head.

By direct injection suction engines and, especially, highly charged diesel engines, it is not possible to optimally adjust the mixture formulation in the entire rotational speed range and power range in such a way that a low smoke content and a low pollutant content with a low consumption results. An essential influence parameter on the mixture formulation and thereby on the combustion is the combustion air-intake spiral in the moment of the fuel injection. This spiral is produced by means of suitable arrangement and construction of the inlet channels in the cylinder head and overlays itself with the compression current by trough pistons. Moreover, it is known to provide at least one filling channel in the cylinder head of the respective cylinder, which effects a sloping or axial oncoming flow of the valve disk. It is also already known German Offenlengungschrift No. 22 34 642, to provide each cylinder with two inlet channels, one of which is formed in aforementioned ways as a filling channel and the other of which is formed as a spiral channel, whereby in the spiral channel, for example, a spiral oncoming flow of the valve disk is effected via spiral channel guide or corresponding component.

The intake or charging rotation is proportional with this engine to the engine rotational speed, whereby a harmonized mixture formulation adjusted by high engine rotational speed and power or by corresponding nominal values of the engine relative to the amount of spiral and, if need be, injection jet construction in lower rotational speed and power ranges is no longer optimal, particularly because here an air deficiency occurs, especially under the influence of the turbo-supercharges. The working of engines in varying rotational speed and load ranges is nevertheless unalterable with many engine applications, for example, with ships and flow or current machine drives.

It is already known to eliminate the mentioned deficiency by means of a stepped or graduated charge with more connectable and disconnectable turbo (exhaust driven)-supercharger sections via increased input of combustion air in the critical rotational speed and power ranges. The more turbo-supercharger sections are, however, costly and expensive.

A further possibility for the elimination of the deficiency consists in further preparing, in the critical operating levels, the theoretical still adequate air masses or volumes for the combustion, by intensively increasing the intake or charge spiral with the fuel of the injection jets and the wall-associated fuel components for the combustion. Moreover, it is known to provide in its place variable valves with deflectors. An aggravated disadvantage of these valves with deflectors is seen in the disconnection of the automatic rotary valve arrangements, which is limited by it and which, essentially by inlet valves of highly charged diesel engines, reduce the occurrence of seat abrasion; moreover, the expenditure for the valves with deflectors and their control is also considerable.

It is an object of the present invention to develop an intake spiral device and/or turbulence device of the initially known type in such a way that it renders it possible, by a simple and inexpensive assembly, to attain the possibility of a low smoke content and low pollutant content combustion in all rotational speed and load ranges of the motor, whereby the torsion of the rotary valve arrangement is not precluded.

SUMMARY OF THE INVENTION

This object is thereby accomplished according to the invention, in that a movable or adjustable flow control part is arranged in the inlet channel, which part is controlled subject to the engine parameters by fully loaded output or performance of the engine in one position and is adjusted, in the partially loaded operation of the engine, from one position to another (different) position, whereby the flow control part in one of its positions influences the air flow or current in spiral strengthening and/or turbulence strengthening ways.

Moreover, further according to the invention, it is advantageous when the flow control part which, by a fully loaded output or performance of the engine, is in a rest position that does not influence or affect the flow in the inlet channel, and is adjusted, in the partially loaded operation of the engine, from this rest position to a work position, whereby the flow control part in its working position deflects the air flow in spiral strengthening and/or turbulence strengthening ways from the valve disk. Thus, the flow control part, in fully loaded operation of the motor and corresponding higher engine rotational speed, takes no influence from the air flow in the at least one inlet channel; there is hereby already reached inherently a low smoke content and a low pollutant content combustion. By comparison, in the partially loaded range, the flow control part diverts the inlet or charge flow in the inlet channel in such a way that a spiral strengthening and/or turbulence strengthening air flow results from the valve disk in the combustion chamber, whereby this is also attainable in this way, that the air is forced away out of a filling channel in spiral channel.

Additionally, in its working position, the flow control part at least throttles the air through the filling channel and, if need be, blocks the air. The flow control part may also be a movable valve which, corresponds to the respective engine performance, is adjustable in the high partially loaded operation in in between positions between the rest and the working positions.

It is especially advantageous, when the flow control part can be mounted, by means of its constructively simple attachment, on or before the cylinder head without changing the inlet channel and therewith is also adapted to be added to the existing engine construction, and/or when the flow control part shifts the surge limit of a provided turbo-supercharger and thereby the partially loaded operation range is increased or enlarged. The present invention is also especially advantageous for use with fuel injected engines, particularly diesel engines.

A further advantageous development of the intake spiral device and/or turbulence device according to the invention can be taken from the dependent claims.

BRIEF DESCRIPTION OF THE DRAWINGS

Illustrated in the drawings are embodiments for the intake spiral device and/or turbulence device formed according to the invention. Shown are.

DESCRIPTION OF THE PREFERRED EMBODIMENT

Figure 1:
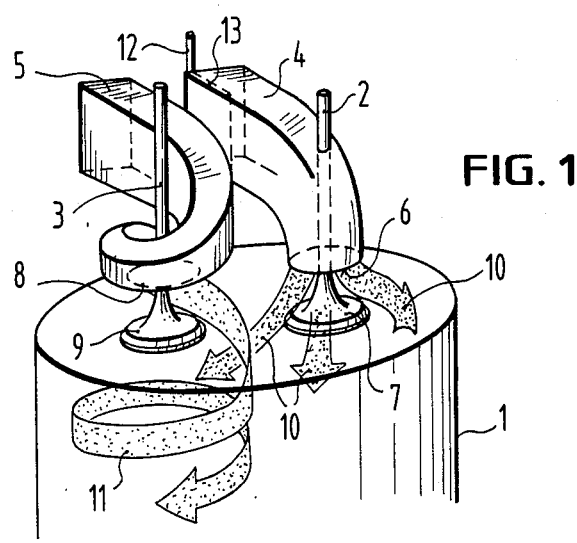
FIG. 1 is a schematic perspective view of the invention for a cylinder having a filling channel and a spiral channel, FIG. 2 a similar schematic, perspective view of a filling channel, FIG. 3 an altered specific embodiment of FIG. 2, FIG. 4 the embodiment according to FIG. 3 with an altered position of the flow control part and, FIG. 5 a cross section through a cylinder head.

FIG. 1 shows schematically a cylinder 1 with two inlet valves 2 and 3 and two inlet channels 4 and 5, with no other portions of the internal (reciprocating piston) combustion engine being illustrated. The two inlet valves 2 and 3 are disposed laterally to the axis of the cylinder 1. The inlet channel, or tangential channel 4 is formed as a filling channel with the smallest possible curvature and a correspondingly small resistance to flow. The portion of the inlet channel 4, which is remote from the inlet valve, extends approximately tangentially, radially, or somewhere between these conditions in relation to the cylinder 1 and first experiences a curvature in a direction approximately parallel to the axis of the cylinder 1. The mouth 6 of the inlet channel 4 is closeable in the cylinder 1 by means of the disk 7 of the inlet valve 2. Likewise, the portion of the inlet channel 5, which is remote from its inlet valve, extends approximately radially, tangentially, or between these directions in relation to the cylinder 1. The portion of the inlet channel 5 which is near its inlet valve is wound spirally around the shaft of the inlet valve 3 in a direction toward the cylinder 1, and the mouth 8 of the inlet channel 5 is closeable in the cylinder 1 by the disk 9 of the inlet valve 3. The inlet channel 5 is consequently formed as a filling channel.

When the inlet valves 2 and 3 are open the inlet or charge air arriving through the filling channel 4 flows in approximately uniformly through the mouth 6 and approximately uniformly all around from the valve disk 7 down and into the cylinder 1, while the inlet air flowing through the spiral channel 5 experiences a twisting force as a result of being directed through the spiralling inlet channel and, in spiral form, flows from the inlet valve disk 9 into the cylinder 1. In FIG. 1 the all-around, approximately uniform discharge from the inlet valve disk 7 is indicated by the arrows 10 and the spiralling air discharge from the inlet valve disk 9 is indicated by the arrow 11. It should be noted that, according to FIG. 1, the portion of incoming charge air, which flows through the inlet channel 4 and into the cylinder 1 toward the left, disturbs the spiral-formed discharge of charge air which flows in through the inlet channel 5, while the right-sided portion of charge air from the inlet channel 4, due to the wall of the cylinder 1, is reversed and supports the spiral or turbulence of the charge air in the cylinder 1. In this respect in FIG. 1, the usual flow conditions during the loading or charging action in combustion engines having cylinders with four valves is illustrated, whereby the adjustment or timing of both inlet channels 4 and 5, as well as the not-illustrated injection valve, takes place with the cylinder 1 in such a way that, with nominal speed and nominal output or power or also with maximum speed and maximum output or power of the combustion engine optimum intake spiral conditions and/or turbulence conditions prevail. This results in a combustion having the least possible smoke and pollutants, along with a high efficiency. However, with a lower power output of the internal combustion (piston reciprocating) engine, a smaller air volume flows through the inlet channels 4 and 5. The spiral formation and/or turbulence formation of the charge in the cylinder 1 is then no longer sufficient for the optimum fuel preparation for combustion; and a combustion rich in carbon and pollutants with an increased consumption occurs.

To eliminate this defect, a rotating flap valve 13 is arranged around a vertical axis 12 in the filling-inlet channel 4, as shown in FIG. 1. In the illustrated state of rest of the flap valve 13 this flap valve lies close to the spiral channel 5 flat on the related channel side and, consequently, is not influenced by the flow through the inlet channel 4; this rest position receives the flap valve 13 with the nominal or fully loaded operation of the internal combustion reciprocating engine. In the partially loaded operation, the flap valve 13 is rotated around the axis 12 in such a way that it, more or less, influences the flow-through of the inlet channel 4 with the following described effect; whereby in the partially loaded operation, the spiral and/or the turbulence of the charge air in cylinder 1 increases and the fuel treatment is thereby improved, so that, as in the fully loaded operation, a combustion having the lowest possible smoke and pollutants and a low consumption is achieved. The engine load-dependent adjustment or control of the flap valve 13, which is disposed in the cylinder head or in a channel connecting part that is arranged to the charge side ahead of the cylinder head, occurs advantageously manually or automatically in dependence on the engine parameters, especially the charge pressure and/or the engine speed.

Figure 2:
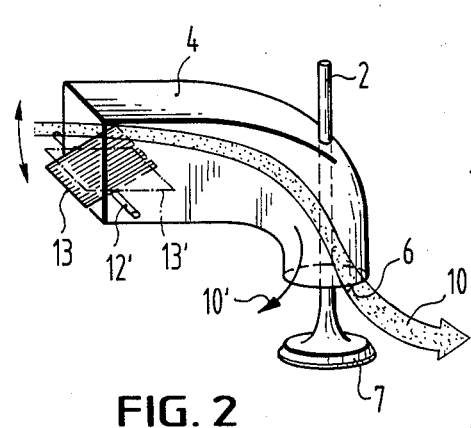
Figure 4:
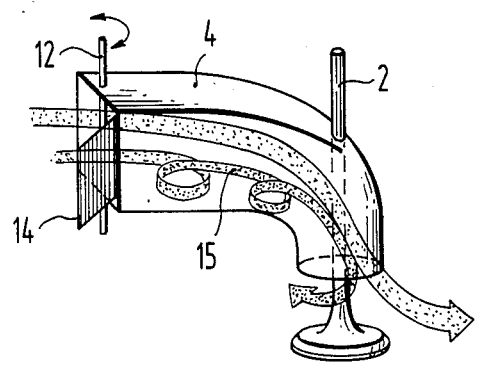

In FIG. 4 the inlet channel 4 is formed as a filling channel and is once again illustrated, together with the inlet valve 2 and the valve disk from an altered angle of view; whereby it is made clear that a function of the flap valve 13 is to rotate around a horizontal, lateral axis 12. The disk 13 is illustrated in FIG. 2 in the half opened position, which corresponds to one of the middle power outputs of the engine. The fully opened flap valve position is indicated by the line 13'. When the disk 13 is partially opened, the flow through the inlet channel 4 is hindered in the lower area near the cylinder, while in the upper area which is distant from the cylinder, an unhindered flow can result. These flow differences continue at least approximately during the length of the inlet channel 4, so that with an opened inlet valve 2 and therewith a lowering of the valve disk 7 from the mouth 6, an irregular or unequal discharge of the charge air into the cylinder arises over the periphery: Whereas the bulk of the charge air, according to the heavily inked arrow 10, flows through in the flap valve 13 along the inlet channel 4 and, again deflected by the valve disk 7 approximately in an extended direction of the inlet channel 4, flows into the cylinder 1, a smaller portion of the charge air, as indicated by the fainter arrow 10', arrives on the sides of the inlet channel 4 in cylinder 1 out of the mouth 6. The arrangement is now affected in such a way that the large charge air portion, according to arrow 10 of FIG. 2, effects a spiral-formation and/or turbulence formation, while the small charge air portion, according to the arrow 10', takes no influence or a lagging influence on the spiral- and/or turbulence-formation of the charge air in the cylinder 1. Altogether, an irregular or unequal discharge of the charge air around the opened inlet valve 2 thus results by means of the partially employed flap valve 13, whereby the spiral—and/or turbulence-strengthened charge air portion is essentially strengthened and the inhibiting charge air portion is essentially weakened; therefore, all together in the cylinder, a high spiral-and/or turbulence-formation occurs despite the average partially loaded operation of the motor. Referring to FIG. 1, with the partial closing of the flap valve 13. thus there results an irregular discharge of the charge air from the inlet valve disk 7 in such a way that, according to the right-directed arrow 10, the discharging, spiral-strengthened, operating charge air volume is increased; to the contrary, according to the left-directed arrow, the diverging, discharging, spiral-lessened, operating charge air volume is decreased.

The flap valve 13 can be formed by an internal combustion engine with two inlet valves 2 and 3 and two inner channels 4 and 5, in such a way that, in its operating position, in which the valve is fully operated and extends across to the longitudinal direction of the inlet channel 4, it closes the cross section of the inlet channel 4 only to some extent or on the other hand also, as will yet be described later, at least approximately fully closes it. This working position takes in the valve in the low partially loaded operation of the internal combustion engine. By this partially opened cross section of the inlet channel 4, vortex paths in the charge air flow occur behind the flap valve 13, which additionally strengthen the spiral- and/or turbulence of the charge air in the cylinder 1; these vortex paths are not illustrated in FIG. 2.

In an internal combustion engine with only an inlet channel 4 with an inlet valve 2 per cylinder, which thus has no second inlet channel constructed as a spiral channel, in its operating position, the flap valve 13 closes only a part of the cross section of the inlet channel 4. Hereby also effected, according to FIG. 2, the irregular or unequal discharge of the charge air from the valve disk 7 over the periphery into the cylinder 1 causes in the cylinder a strengthening of the spiral and/or the turbulence of the charge air with the already mentioned improvement of the fuel preparation and combustion.

Figure 3:
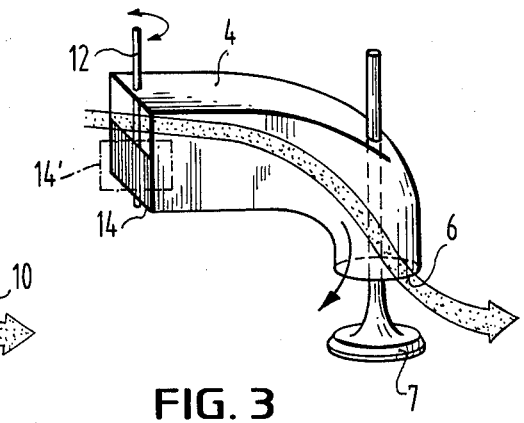

The arrangement according to FIG. 3 corresponds to that of FIG. 2, whereby the flap valve 14 is rotatable around a vertical axis 12 and has an essentially smaller height than the inlet channel 4, so that, in the illustrated operating position, hence in the closed portion, the valve seals only the lower portion of the inlet channel 4. There arises thereby, as in the FIG. 2 description, an irregular or unequal discharge of the charge air out of the mouth 6 into the cylinder 1 with the spiral-and/or turbulence-strengthening effect. In the fully opened position, the flap valve 14 occupies the position indicated with the line 14', in which it does not influence flow-through of the inlet channel 4. In the partially opened position, according to FIG. 4, the flap valve 14 engages transversely, whereby, at least to one side, additional vortex paths indicated by the arrow 15, which effect spiral strengthening in the charge air, form in the charge air current, as has already been referred to in FIG. 2.

Figure 5:
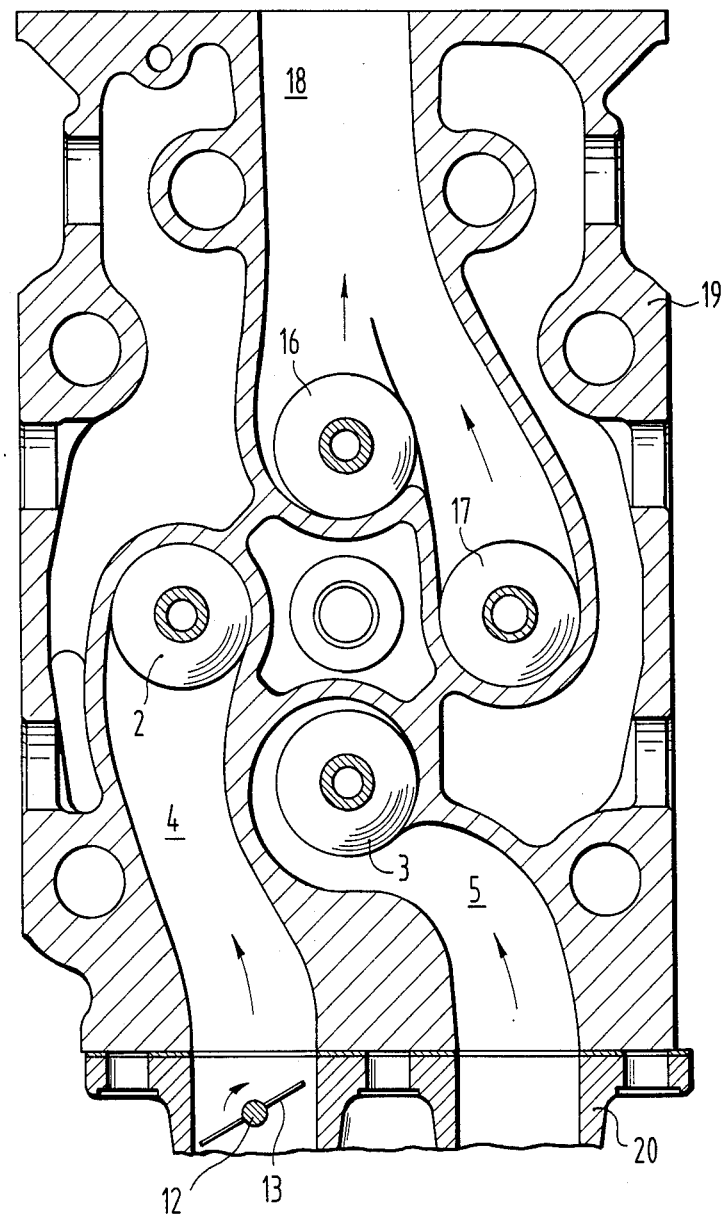

In the cylinder head as shown in FIG. 5, a filling channel 4 and a spiral channel 5, which correspond to the inlet channels in FIG. 1, extend to the inlet valves 2 and 3. Similarly, two valves are provided for the exhaust the outlet valves 16 and 17, from which leads away an outlet channel 18. In the filling channel 4 of the cylinder head 19, that is, in the connection portion 20 which is superposed on the cylinder head, a flap valve 13 was rotatably disposed around a vertical axis 12 in such a way that it was capable of acting, in its operating or closing position as the case may be, as a throttle valve or flap to almost throttle down the flow-through of the filling channel 4; the charge air volume will hereby push back out of the filling channel 4 into the spiral channel 5, so that all of the charge air must flow through in the spiral channel 5 and consequently a great spiral- and/or turbulence-formation is obtained in the cylinder. The valve occupies this operating or closed position as the case may be by a lower partially loaded operation of the internal combustion engine; the flap valve 13 will be increasingly opened with climbing power outputs of the engine until, by the nominal or maximum output of the motor, it occupies its fully opened and thereby rest position. Thus with the increasing power output of the engine, an increasing flow through the filling channel 4 takes place, so that an increasing charge air volume flows in almost spiral-free through the inlet valve 2 into the cylinder. Moreover, the adjustment takes place in such a way that, in all loaded operations of the engine, optimum spiral-and/or turbulence-formation in the cylinder 1 will be achieved.

The rotary control of the flap valve 13 or 14 takes place, as already mentioned, preferably automatically as a function of, or in dependence on, the respective power outputs of the engine signaling parameters, especially as a function of the engine rotational speed and/or the supercharge pressure; the rotary motion itself can be effected via usual setting mechanisms. The rotary control can also take place as a function of the filling position on the injection pump. The adjustment can take place merely two-staged with rest-opened position and operating-closed position, with intermittent inbetween positions, or also continuous with inbetween positions. Instead of the hinged valve, as described for all embodiments, different aperture plates, for example, aperture plates, can be provided. Furthermore, by the construction according to FIG. 5 it is possible, instead of the throttle valve or flap to provide an engine power-dependent control of the inlet valve 2, in such a way that the inlet valve 2 is opened only by a full power output of the engine, is only partially opened with declining power outputs, and in lower partially loaded operation is eventually stopped fixed closed. This construction form is attainable in an easier manner with a spatial cam steering for the inlet valve 2.

The inlet spiral device and/or turbulence device is also not vertical, in contrast to FIGS. 2–4, but instead adaptably slants in the cylinder flowing inlet channels: In this manner, with an irregular from-forward-here-in charge air flow from the inlet valve into the cylinder, which has inlet channels, via corresponding influence of the charge air flow in the inlet channel by means of adjustable flap valves, also in the partially loaded operation of the engine, a charged spiral- and/or turbulence-strengthening can be achieved via the charge air flow from the inlet valve.

Differing from the preceding described embodiments, it is also possible with engines having both filling channels and spiral channels, to arrange as controlling part the serving flap valves in the spiral channels, to adjust the engine on optimum charged spiral-and/or turbulence-conditions in the partially loaded range by opened flap valves, and in the fully loaded operation to adjust the flap valves in a closing direction for at least a partial blocking of the flow-through cross section of the spiral channel or returning a large charged portion into the filling channels. Both in the filling and in the spiral channels flaps can be arranged, which are adjusted, dependent on the engine load opposing to each other and thereby simultaneously or successively, dependent on the engine load.

Moreover, it is possible to arrange the stream or flow control part rigidly in a filling channel with, as the case may be, the axial oncoming flow of the valve disks.

It is possible, via a simple, practical attachment, to otherwise locate the flow control part on or before a cylinder head without changing its inlet channel form. It is thereby also adapted to the addition of the existing engine construction. The flow control part can be formed in such a way that it shifts the surge limit of a provided turbo-supercharger, so that it gives an enlarged partially loaded-operation range.

Reference Designation List 1 cylinder
2 inlet valve
3 inlet valve
4 inlet ohannel
5 inlet channel
6 mouth
7 disk
8 mouth
9 disk
10 arrow
10' arrow
11 arrow
12 axis
12' axis
13 flap valve
13' line
14 flap valve
14' line
15 line
16 outlet valve
17 outlet valve
18 outlet channel
19 cylinder head
20 connection piece

We claim:

1. An intake spiral and/or turbulence device for a fuel combustion engine with fuel injection and with a cylinder which is provided with at least one inlet channel and with a cylinder head which has a combustion chamber, said device comprising:

a first intake channel which is formed as a spiral channel through which charge air can flow into said chamber, said first intake channel having a first end and a second end, with said first end being provided with a mouth which is disposed around a first inlet valve and which is closable in said combustion chamber in said cylinder head by a first valve disk which is disposed on a portion of said first inlet valve which extends into said cylinder, and a second intake channel which is formed as a filling channel through which charge air can flow into said chamber, said second intake channel having a first end and a second end, with said first end being provided with a mouth which is disposed around a second inlet valve and which is closable in said combustion chamber in said cylinder head by a second valve disk which is disposed on a portion of said second inlet valve which extends into said cylinder, and with said second intake channel further being provided with an adjustable flow control part which is arranged in its second end, said flow control part being controlled as a function of at least one engine parameter, further, with said flow control part being in a rest position during a fully loaded performance of said engine and in a working position during a partially loaded operation of said engine, wherein said flow control part has no effect on the flow of charge air through said second intake channel while said flow control part is in said rest position, and wherein said flow control part, while in its working positions, adjusts to at least partially close said second intake channel and to deflect the charge air flow from said second valve disk in such a way that the intake spiral and turbulence of said device is strengthened.

2. An intake spiral and/or turbulence device according to claim 1, wherein said flow of charge air through said second inlet channel is an axial oncoming flow in the direction of said second valve disk, and wherein said flow control part is an aperture plate which, in its working position, changes said axial oncoming flow into an unequal oncoming flow that is, if need be, over the periphery of said second valve disk.

3. An intake spiral and/or turbulence device according to claim 2, wehrein said flow control part is a rotatable flap valve which is arranged around an axis of rotation disposed in said second end of said second inlet channel.

4. An intake spiral and/or turbulence device according to claim 3, wherein said rotatable flap valve acts as a throttle and, in its working, adjusts, as a function of an engine parameter, to various inbetween positions which range between said rest position and a maximum working position.

5. An intake spiral and/or turbulence device according to claim 2, wherein said flow control part is adjustable as a function of the charge pressure of said engine.

6. An intake spiral and/or turbulence device according to claim 2, wherein said flow control part is adjustable as a function of the rotational speed of said engine.

7. An intake spiral and/or turbulence device according to claim 2, wherein said flow control part is adjustable as a function of the filling position on an injection jet of said engine.

8. An intake spiral and/or turbulence device according to claim 2, wherein said flow control part is a simply constructed attachment which can be mounted on said cylinder head without changing the form of said second inlet channel, whereby said flow control part is also adapted to be added to an existing engine construction.

9. An intake spiral and/or turbulence device according to claim 2, wherein said flow control part is a simply constructed attachment which can be mounted on said cylinder head without changing the form of said second inlet channel, whereby said flow control part is also adapted to be added to an existing engine construction.

10. An intake spiral and/or turbulence device according to claim 2, wherein said engine is provided with a turbo-supercharger having a surge limit, and wherein said flow control part shifts said surge limit of said turbo-supercharger and thereby expands the range of said partially loaded operation of said engine.

* * * * *